United States Patent

Pitkanen

[11] 4,069,669
[45] Jan. 24, 1978

[54] INERTIAL TURBINE ENERGY STORAGE BRAKING AND POWER TRANSMISSION SYSTEM

[76] Inventor: Alan R. Pitkanen, 3120 Ocean Drive, Manhattan Beach, Calif. 90266

[21] Appl. No.: 715,240

[22] Filed: Aug. 18, 1976

[51] Int. Cl.² .................... F16D 33/00; F16F 15/30
[52] U.S. Cl. .................... 60/325; 60/413; 60/414; 74/572
[58] Field of Search .......... 60/325, 371, 408, 413, 60/414, 330, 364, 338, 347, 351, 357; 74/571 M, 572, 573 F; 192/3.22, 3.23; 188/296; 185/46, 27

[56] References Cited

U.S. PATENT DOCUMENTS

| | | | |
|---|---|---|---|
| 3,014,341 | 12/1961 | Matthews et al. | 74/572 X |
| 3,129,559 | 4/1964 | Matthews | 74/572 X |
| 3,264,827 | 8/1966 | Siptrott | 60/325 |
| 3,360,924 | 1/1968 | Davis | 60/325 X |
| 3,948,048 | 4/1976 | Lifka | 60/330 |

FOREIGN PATENT DOCUMENTS 1,110,682   7/1961   Germany ...................... 188/296

*Primary Examiner*—Edgar W. Geoghegan
*Attorney, Agent, or Firm*—Keith D. Beecher

[57] ABSTRACT

An inertial turbine system is provided which stores energy in a rotating flywheel shell by passing a fluid, such as mercury, in and out of the shell during braking or acceleration of the vehicle in which the system is installed. The resulting fluid flywheel is coupled to an input/output shaft through a turbine transmission system. The transmission system is constructed to effect optimal energy transfer over a wide range of relative speeds between the rotating flywheel shell and the input/output shaft to which the shell is coupled.

17 Claims, 6 Drawing Figures

INERTIAL TURBINE ENERGY STORAGE BRAKING AND POWER TRANSMISSION SYSTEM

BACKGROUND OF THE INVENTION

Most present day braking systems are dissipative in nature in that they convert kinetic energy of motion into waste heat and concurrent wear of the braking parts. This applies to automobiles, trains, motorcycles, and other vehicles, as well as to stationary industrial systems. Thus, whenever a present day moving vehicle is slowed or stopped, its kinetic energy is dissipated as heat by the braking system. The lost energy must subsequently be replaced by an increased consumption of fuel when the vehicle is subsequently accelerated back to its cruising speed. This results in a tremendous waste in energy, especially in urban areas where traffic patterns necessitate repeated accelerations and decelerations of the vehicle.

The system of the present invention, however, provides a mechanism in which the kinetic energy from the moving vehicle during a braking action is stored until it is required for the acceleration of the vehicle up to its cruising speed, or for maintaining the vehicle at cruising speed. Apart from obviating waste energy, the system of the invention is not subject to wear during the braking intervals, and it does not contaminate the atmosphere with brake lining particles.

Another problem having environmental impact is the inability of most present day transmission systems to couple power sources, such as internal combustion engines, to the drive shaft of the vehicle with optimal efficiency for varying speeds and power requirements of the vehicle. Fixed ratio transmissions of the prior art, for example, require engines to run over a range of speeds a major portion of the time, and thereby to operate at off-peak efficiency. The prior art continually variable transmission, which allows the power source to run at a constant speed at which engine efficiency is a maximum, has not proven to be economically feasible because of the cost, complexity and wear inherent in that type of transmission.

The inertial-turbine system of the present invention provides a simple, feasible, reliable and efficient energy storage system into and from which power can be added or removed at will. Moreover, the system of the invention is capable of receiving or discharging energy at peak efficiency over a wide range of speeds, and without expensive and complicated transmission and clutching systems, variable speed traction drives, electromechanical speed conversion units, or the like.

The acceleration requirements of present day transportation systems increase materially the required peak horsepower of the energy sources. The cruising power requirements of most vehicles are usually an order of magnitude less than the acceleration power requirements. Thus, engine size and cost are relatively high due to the acceleration requirements. The prior art secondary power boost systems which are intended to decrease the peak power engine requirements have not proven to be economically feasible due to their inherent complexity and high cost.

The system of the present invention is constructed to handle peak power requirements during acceleration without any need to increase engine sizes, as is the case in the prior art transmission systems. The inertial-turbine system to be described herein stores energy in a fluid flywheel. The fluid used to store the energy inside the rotating flywheel shell is also used to transfer energy to and from the flywheel shell during braking and acceleration. The system of the invention is constructed to effect optimal energy transfer between the flywheel and the drive shaft of the vehicle over a wide range of relative speeds. The system permits external operator-controlled flow of the working fluid into and out of the flywheel shell to dictate the braking and acceleration levels of the system within prescribed limits, while obtaining optimal energy transfer between the flywheel and the drive shaft at all speeds.

The inertial-turbine system of the invention, moreover, permits complete decoupling of the drive shaft from the flywheel without any requirement for mechanical clutches. In addition, the system can provide a required braking torque at any speed level, upon demand. When non-optimal relative speeds occur between the flywheel and the drive shaft because of external demands, the system will quickly and automatically move to optimize the energy transfer between the flywheel and the drive shaft, or vice versa.

Any appropriate working fluid can be used in the system of the invention, although mercury is presently preferred because of its high density.

DETAILED DESCRIPTION OF THE ILLUSTRATED EMBODIMENTS

Figure 1:
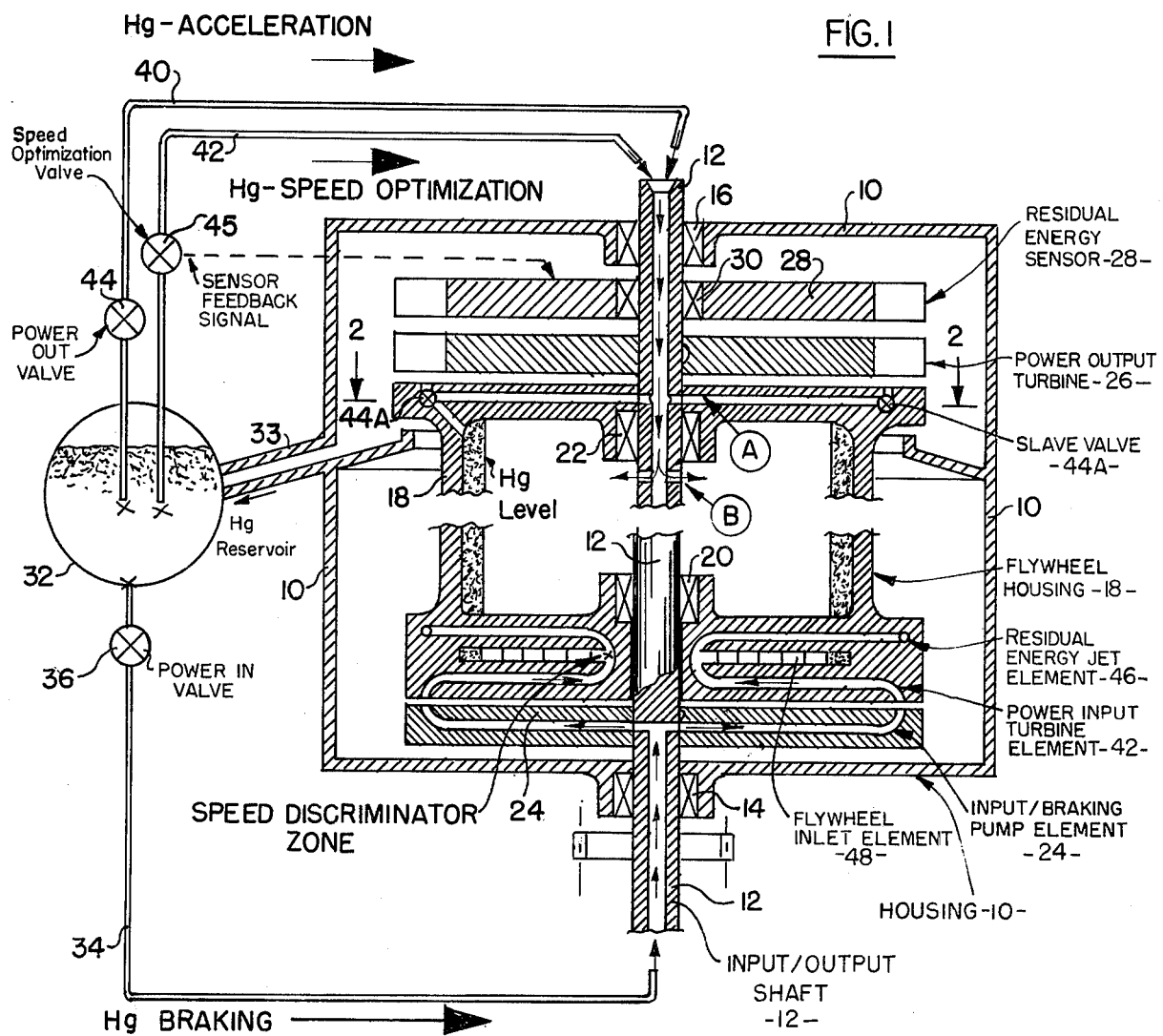
FIGS. 1 and 2 are schematic representations of one embodiment of the invention which is illustrative of the general principles on which the inertial-turbine energy storage system of the invention is predicated, FIG. 1 being a side section of the embodiment, and FIG. 2 being a section taken essentially along the line 2—2 of FIG. 1 of a fluid flywheel which is included in the embodiment of FIG. 1.
Figure 2:
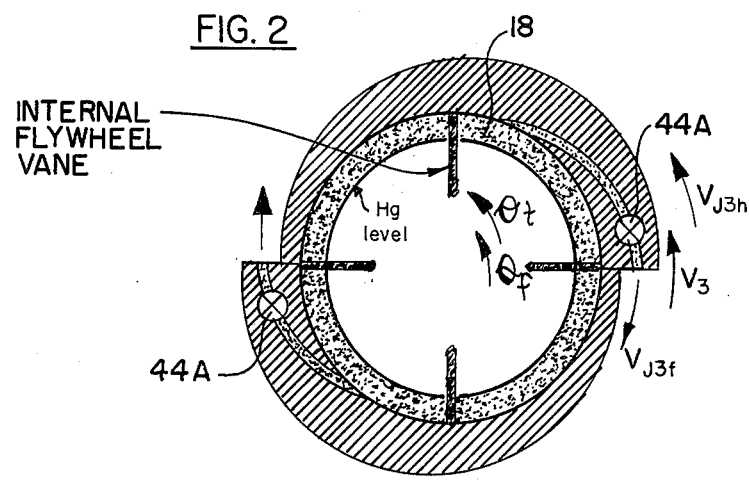

The system shown schematically in FIGS. 1 and 2 includes a housing 10, and a tubular input/output shaft 12 rotatably mounted in the housing in bearing 14 and 16, and extending along the central longitudinal axis of the housing. A shell-like flywheel housing 18 is rotatably mounted on shaft 12 on bearings 20, 22. An input/braking pump element 24 is mounted on shaft 12, as is a power output turbine 26. A residual energy sensor 28 is rotatably mounted on shaft 12 in bearings 30.

A reservoir 32 is provided for the working fluid which may, as mentioned above, be mercury. The working fluid is returned to the reservoir from the upper end of housing 10 through a conduit 33. The working fluid from the reservoir is introduced through one end of tubular shaft 12 through a pipeline 34 for braking purposes, a "power-in" valve 36 being included in the pipeline. The working fluid is introduced to the other end of tubular shaft 12 through pipelines 40, 42 and through respective "power-out" and "speed optimization" valves 44 and 45. The valve 45 is operated by the residual energy sensor 28.

During the braking/energy storage mode, the input-/output shaft 12 is assumed to be rotating at a speed $\theta_t$, and the shaft is coupled to the vehicle in which the system is installed. During the braking/energy storage mode, the working fluid from reservoir 32 is introduced into the input/braking pump element 24 by opening the power-in valve 36. The action of pumping the fluid through the pump element 24 immediately applies a braking torque to shaft 12. The energy involved in this braking action is transferred to the working fluid which now enters the power input turbine element 42 at one end of the flywheel housing 18. The fluid applies a torque against the input turbine element 42 and against the flywheel 18, which is integral therewith.

Assuming that the flywheel 18 is stalled, or moving at a much slower speed $\theta_f$ than the speed $\theta_t$ of shaft 12, the fluid acts to accelerate the flywheel and the fluid passes through a speed discriminator zone X into a pair of residual energy jet elements 46. The fluid is emitted from the elements 46 as jets, the jet orifices being directed so that the jets issuing therefrom serve to accelerate the flywheel in conjunction with the action of the input turbine about the axis of the tubular shaft 12.

If under the aforesaid conditions, the flywheel housing 18 has a relatively small amount of working fluid within its interior, and hence a small amount of inertia, the combined torques of the input turbine and the jets quickly accelerate the flywheel speed towards the speed of the input/output shaft 12 (i.e., $\theta_f \rightarrow \theta_t$).

As the speed of the flywheel $(\theta_f)$ approaches the speed of the input/output shaft $(\theta_t)$ the velocity of the fluid passing through the speed discriminator zone X decreases owing to the centrifugal acceleration of the fluid caused by the increasing speed of the flywheel. At a critical velocity, the fluid can no longer negotiate the corner at the speed discriminator zone X, and it no longer enters the residual energy jet element 46. Instead, the fluid falls into a flywheel inlet element 48, where it travels a spiral path into the interior of the flywheel shell 18. The fluid now entering the interior of the shell 18 increases the mass-moment of the flywheel.

The foresaid action serves to maintain $\theta_f$ close to $\theta_t$. The system automatically shifts from the jet action to the mass-moment build-up in maintaining a condition of minimum relative speed between the flywheel and the shaft. It should be noted that the braking force is dependent on the amount of working fluid released by valve 36, and is independent of the relative speed between the flywheel and the shaft.

With the system of FIG. 1, the flywheel and the input/output shaft will tend to slow down together. This action ultimately limits the speed range over which the flywheel can effectively receive and store energy from the input/output shaft since as the flywheel slows its capacity for storing energy diminishes. As will be seen in the preferred embodiment of FIG. 3 it is possible to interpose a fluid jet velocity optimizing assembly, or equivalent, between the input braking pump element 24 and the flywheel power input turbine element 42, thereby extending the speed range over which the flywheel effectively receives energy.

During the energy release mode it will be assumed that the flywheel is rotating at some speed $\theta_f$, and that the flywheel is filled with a maximum amount of the working fluid. It will also be assumed that shaft 12 is stalled, or rotating very slowly.

In the schematic diagram of FIGS. 1 and 2, the power-out valve 44 releases the working fluid through pipeline 40 to orifice A; whereas the speed optimization valve 45 releases the working fluid through the pipeline 42 exclusively to orifice B, through suitable ducting and rotating seals (not shown) within the input/output shaft 12. When valve 44 is opened it permits the working fluid to apply a force on a pair of slave valves 44A located at the perimeter of the flywheel housing 18, as best shown in FIG. 2.

The force on the slave valves 44A causes them to open, so that the working fluid in the flywheel housing may be emitted from the housing as a pair of jets directed tangentially of the peripheral surface of the housing 18. The fluid jets possess kinetic energy from the hydrostatic head of the fluid in the flywheel housing which, in turn, is provided by the rotation of the flywheel. The resulting jets impinge on the power-out turbine 26, thereby applying a torque to shaft 12 in the direction of flywheel rotation. This torque assists the power source in driving shaft 12.

An alternate configuration would rotatably mount power-out turbine 26 upon shaft 12. Suitable gearing would transmit torque to a second shaft, thus yielding separate and independent input and output shafts.

The residual energy sensor 28 receives the working fluid after it has passed through the blades of the power-out turbine 26. If there is residual velocity in the fluid after it has passed through the blades of turbine 26, sensor 28 turns and causes valve 45 to open so that additional working fluid may be introduced into the interior of the flywheel housing to reduce the speed of the flywheel and thereby to reduce the jet velocity. The effect of sensor 28 is to maintain the flywheel at the proper speed, so that all available energy will be transferred from the flywheel to the shaft.

Figure 3:
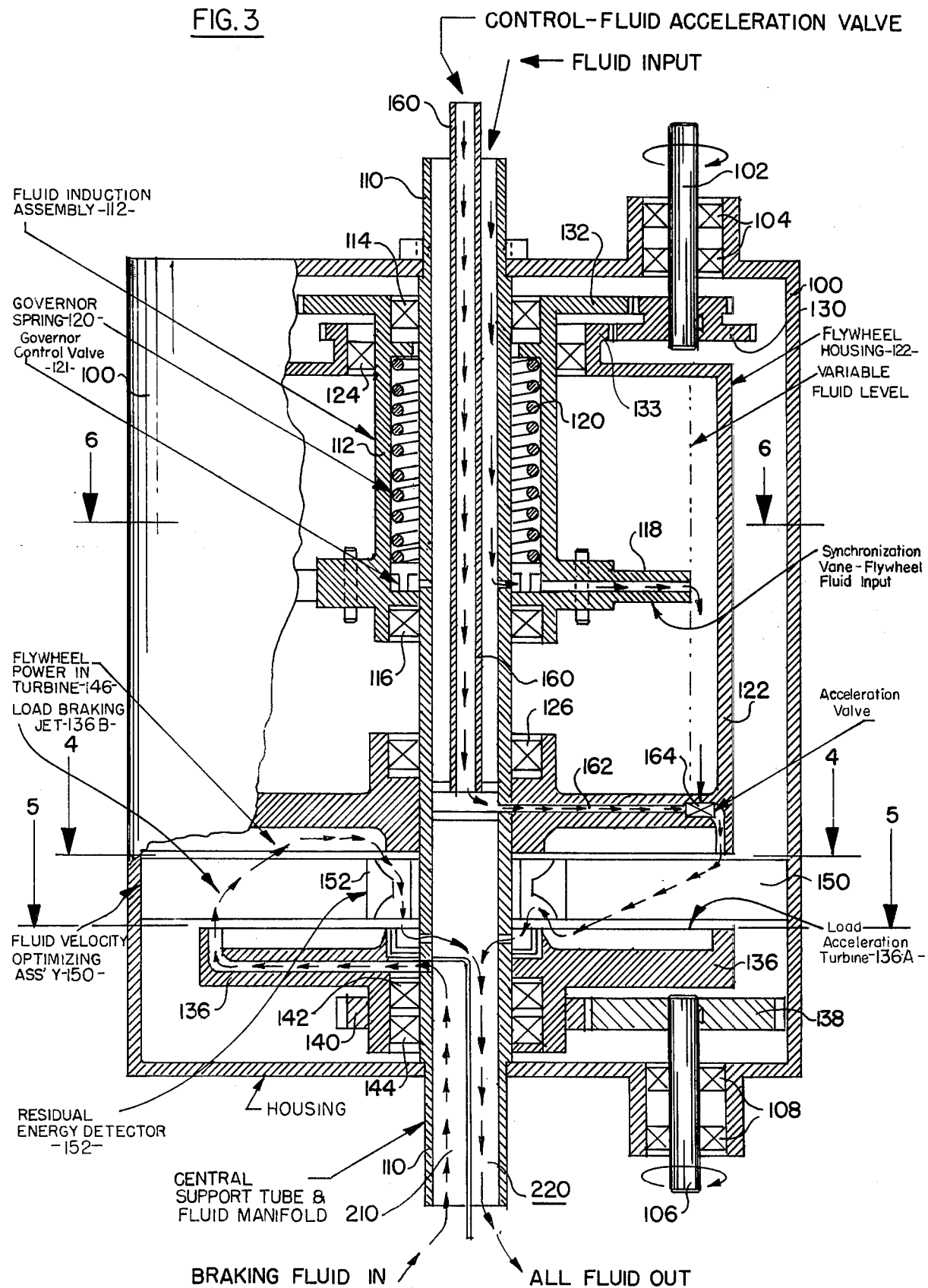
FIG. 3 is a side section of a presently preferred embodiment of the invention.

FIG. 3 is a schematic sectional diagram of a presently preferred embodiment of the energy storing/braking and power transmission system of the invention, which is predicated on the same general principles as the embodiment of FIGS. 1 and 2. The embodiment of FIG. 3 comprises a housing 100. A driven shaft 102 from an appropriate power source is rotatably mounted in housing 100, to be rotatable about an axis spaced from and parallel to the central longitudinal axis of the housing. A second shaft 106 is rotatably mounted in housing 100 and is supported in bearings 108. The latter shaft is coupled to the vehicle, and constitutes the drive shaft. Shaft 106 is coaxial with shaft 102 in the illustrated embodiment.

A central manifold tube and support shaft 110 extends through housing 100 along the central axis of the housing. A fluid induction assembly 112 is rotatably mounted on shaft 110 by a pair of bearings 114 and 116. A pair of synchronization vanes 118 extend radially outwardly from the induction assembly 112. A governor spring 120 is mounted within assembly 112 coaxial with the central axis of housing 100. A governor control valve 121 is mounted within assembly 112, and it is biased to a closed position by spring 120. A flywheel housing 122 is rotatably mounted within the housing 100 in bearings 124 and 126.

Shaft 102 is coupled to the fluid induction assembly 112 and to flywheel housing 122 by means of synchronization gears 130, 132 and 133. Shaft 106, on the other hand, is coupled to a load braking disc 136 through gears 138 and 140. Braking disc 136 is rotatably mounted on shaft 110 by bearings 142 and 144. The braking disc has two sub-elements (FIG. 5), namely a load acceleration turbine 136A and a pair of load braking jets 136B. Gear 140 is coupled to the braking disc 136.

A turbine 146 is formed integral with the flywheel housing 122 at the lower end of the housing in FIG. 3. Turbine 146 has spiral vanes similar to the vanes shown in FIG. 5. A fluid velocity optimizing assembly 150 is interposed between the turbine 146 and the braking disc 136. A residual energy detector disc 152 forms part of the fluid velocity optimizing assembly, as will be described.

The load braking disc 136 functions to transmit power to, or receive power from, the input/output shaft 106. The braking jets 136B (FIG. 5) are positioned at the periphery of the braking disc, and they receive braking fluid from a passage in the central manifold tube and central support shaft 110, as shown in FIG. 3, and by way of radial channels in the disc.

During the braking mode, the jets issuing from the braking disc are directed into the fluid velocity optimizing assembly 150. By controlling the amount of braking fluid introduced into the braking disc, the intensity of the jets, and hence the braking torque exerted on shaft 106, may be regulated.

Figure 5:
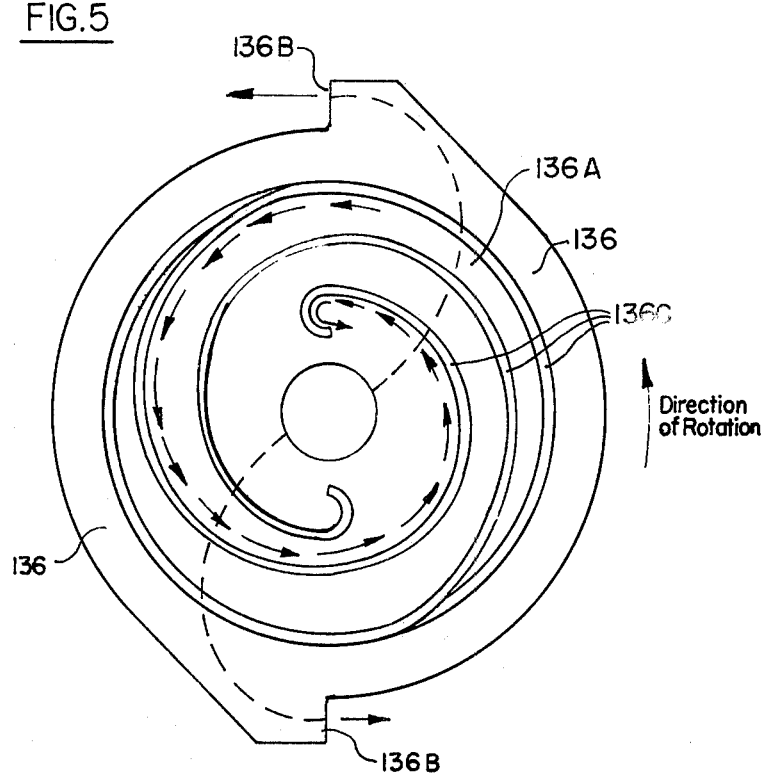
FIG. 5 is a plan view of a load acceleration turbine included within the assembly of FIG. 3 taken along the lines 5—5 of FIG. 3.

During the power transmission mode, the load acceleration turbine 136A receives the working fluid from the flywheel housing 122 through the fluid velocity optimizing assembly 150. The turbine serves to convert the kinetic energy of the fluid passing through its vanes 136C (FIG. 5) into a torque which is applied to shaft 106. As shown in FIG. 5, the turbine vanes 136C are shaped to spiral inwardly from the periphery of the disc toward the center, and the vanes are capable of receiving the braking fluid from the optimizing assembly 150 at any radial distance from the center. Then, as the fluid works its way to the center of the disc, it gives up its kinetic energy to the disc.

Just before exiting from the vanes of turbine 136A the fluid is deflected 180° back away from the direction of rotation of the disc 136 by the ends of the turbine vanes 136A, as shown in FIG. 5. Therefore, depending upon the relationship between the velocity of the fluid stream from the fluid optimizing assembly 150, the angular velocity of turbine 136A, and the radius at which the fluid strikes the turbine vanes, the fluid leaving the turbine may be moving angularly with respect to the housing 100 in the direction of rotation of the disc 136, or in the opposite direction, or the relative angular velocity between the fluid and the housing may be zero. The fluid leaving the load acceleration turbine 136A is directed into the residual energy detector 152 which is a component of the fluid velocity optimizing assembly 150.

The power source may be operated at a constant rotational speed corresponding to its peak efficiency. As described, the driven shaft 102 of the power source is coupled to flywheel housing 122 and to fluid induction assembly 112 through gears 130, 132 and 133. The gears 130, 132 and 133 are selected so that the flywheel housing 122 will turn at approximately twice the speed of the fluid induction assembly 112.

The working fluid which stores the energy in the flywheel housing 122 is also used to control the flow of energy into and out of the system. In the braking mode, the amount of braking is directly controlled by controlling the flow of braking fluid to the braking disc 136, as described above.

During the power transmission mode, fluid is introduced through a pipeline 160 in the manifold tube and central support shaft 110. The fluid is then transferred into a pair of radial channels 162 in the lower end of the flywheel housing 122 through a rotating seal assembly (not shown). The fluid channels 162 operate on a pair of diametrically opposite spool valves such as spool valve 164 at the ends of the respective channels, and the spool valves release the fluid in the flywheel housing 122 at high velocity into the fluid velocity optimizing assembly 150. Thus, the energy transmission from the flywheel to the shaft 106 is indirectly controlled by the control fluid introduced into pipeline 160. The rotation of flywheel 122 creates a pressure head in channels 162 for the control fluid by centrifugal action, and this head provides the force required to operate the spool valves 164.

A small bleed passage is provided through the spool valves 164 to provide a release for the control fluid. Therefore, the control fluid must be continually introduced into the pipeline 160 if the spool valve 164 is to be maintained open. The size of the bleed passage should be small so that the quantity of control fluid required to maintain the spool valve 164 in its open state also is small. The spool valve 164 will close and the flow of the working fluid from the flywheel housing 122 will be stopped, whenever the flow of control fluid into the pipeline 160 is interrupted.

The fluid optimizing assembly 150 is attached to housing 100, and it is stationary. This non-rotating assembly serves optimally to match the fluid jet velocities from the braking disc 136 and from the spool valve 164 with the rotational speeds of the turbines 136A and 146. "Optimally" is used herein to mean that all of the kinetic energy available in the fluid jets is utilized in driving the shaft 106, or is effectively stored in the flywheel housing 122.

The fluid optimizing assembly 150 has the capability of receiving fluid from the fluid jets at a fixed radius, and of discharging the fluid into the spiral turbine vanes of turbine 146 or turbine 136A at a different and variable radius. This capability for changing the radius at which the fluid strikes either turbine permits an adjustment to be made of the fluid tangential velocity relative to the turbine tangential velocity, and permits the selected radius at all times to be such that optimum transfer of kinetic energy from the jets to the turbine blades is achieved.

The residual energy detector 152 in the optimizing assembly 150 varies the aforesaid radius in a continuous manner so as to assure that the fluid impinging on the vanes of either turbine 146 or 136A will at all times be at the proper radius to assure that substantially all the kinetic energy in the jets will be transferred to the turbine.

Figure 4:
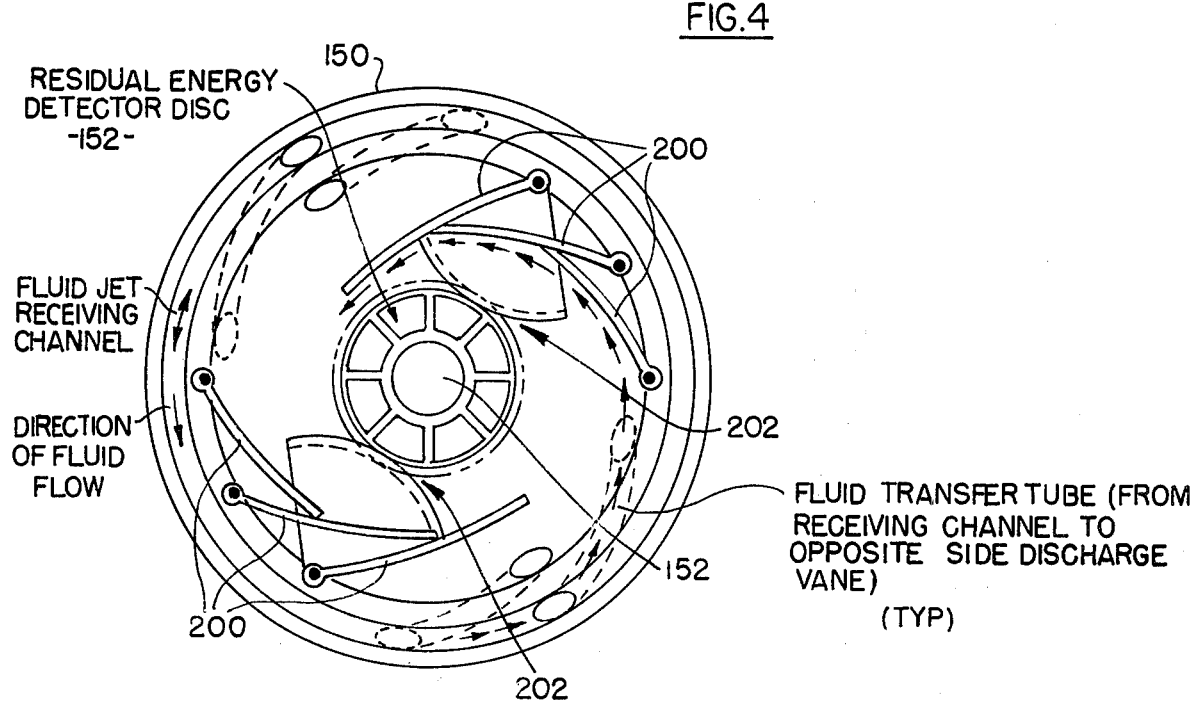
FIG. 4 is a plan view of a fluid velocity optimizing assembly included in the embodiment of FIG. 3 taken along the lines 4—4 of FIG. 3.

As shown in FIG. 4, the residual energy detector disc 152 is coupled to a variable radius vane assembly 200 in the fluid velocity optimizing assembly 150. This coupling is effectuated by a high ratio epicyclic gear train 202, or equivalent, such that any rotation of the detector disc 152 in the direction of rotation of the corresponding turbine causes the radially variable vanes 200 to move to a smaller radius. Conversely, any rotation of the detector disc 152 counter to the direction of rotation of the corresponding turbine causes the variable vanes 200 to move to a greater radius.

The detector disc 152 is caused to turn by the fluid which is ejected from the inside of the channel of the corresponding turbine 136A or 146, and the detector disc in effect measures the amount of energy remaining in the fluid after it has passed through the turbine 136A or 146.

It will be remembered that the turbine vanes of turbines 136A and 146 cause the fluid passing through the vanes to execute a 180° turn at its exit. Thus, the fluid leaves each turbine 136A and 146 with a velocity relative to the particular turbine which is counter to the direction of rotation thereof. However, the fluid may have a velocity relative to the stationary housing 100 which is in the direction of rotation of the corresponding turbine, or counter to the direction of rotation, or most importantly the fluid may be static or motionless with respect to the housing. When the fluid is motionless with respect to the housing, it is without kinetic energy and optimal conditions obtained. That is, all the available energy has been extracted from the fluid by the turbine blades. Under these conditions, the fluid is also powerless to rotate the residual energy detector disc 152 in either direction.

If we assume that the fluid ejected from turbine 136A or 146 is moving counter to the direction of rotation relative to the housing, then the fluid will rotate the residual energy detector 152 in a direction counter to the direction of rotation of the corresponding turbine. The epicyclic gear train 202 will respond to the rotation of the detector to adjust the radially variable vanes 200 to a greater radius. This means that the fluid now must operate against a centrifugal force in the turbine channel for a greater distance and time, resulting in a lower ejection velocity, which in turn means that the fluid velocity relative to the housing tends towards zero. The process continues until zero velocity of the ejected fluid is reached. This means that the adjustment procedure tends at all times towards optimizing the transfer of energy between the flywheel housing 122 and turbine 136A, and between the braking disc 136 and turbine 146, depending upon the mode of operation of the overall system.

Assuming now the opposite condition, that is, that the ejected fluid is moving in the direction of rotation of the corresponding turbine relative to the housing, the above described adjustment procedure will be reversed, but will again tend to adjust the system so that zero residual energy remains in the ejected fluid, again to maintain the aforesaid optimal conditions.

The flywheel housing 122 serves to store energy during the braking mode, and to accumulate energy over a time period from the power source. The flywheel housing is essentially a hollow cylinder into which working fluid is injected, and removed. The flywheel housing may include suitable internal means, such as radial baffles, to cause the fluid within its interior to rotate at substantially the same angular speed as the cylinder itself. The cylinder and the fluid contained therein are caused to turn at a constant speed by the fluid induction assembly 112.

It should be understood that the addition of fluid to flywheel housing 122 increases its moment of inertia. Since the flywheel housing is constrained to turn at a constant speed, such an increase in its mass moment of inertia represents an increase in the energy level of the flywheel. This increase in energy results either from the braking process or from the power source. Conversely, a reduction in the fluid level in the flywheel is a reduction of its energy level, and the energy lost by the flywheel is always transmitted to the load through the output shaft 106.

Energy is added to the flywheel housing 122 from the power source by direct mechanical coupling through gears 130, 132 and 133. Any increase in the power input from the power source causes an increase in the torque applied to the input shaft 102, and this torque increase tends to cause the speed of the flywheel to increase. However, the fluid induction assembly 112 responds to the increase in torque to inject additional fluid into the flywheel, and the net effect is that the mass moment of inertia of the flywheel increases, and its angular velocity remains approximately constant. At the same time, the net energy stored in the flywheel increases.

It is to be noted that the flywheel jets, which are controlled by the spool valves 164, are oriented to emit the working fluid at high pressure in a direction counter to the direction of rotation of the flywheel housing 122. The jets, therefore, create a forward thrust on the entire flywheel assembly. This action tends to cause the flywheel housing to accelerate, and would do so, were it not for the action of the fluid induction assembly 112. The fluid induction assembly reacts to add fluid to the flywheel housing to control the flywheel speed and to keep it constant. In essence, high energy fluid is released from the periphery of the flywheel housing by the spool valves 164, while a lesser quantity of low energy fluid is added to the inner fluid surface in the flywheel housing by the induction assembly 112. The difference of the energy level of the fluid which was released and the energy level which the added fluid achieves when it reaches the fluid surface of the flywheel housing is the energy which has been extracted and which has been made available for the load.

In the above process the total quantity of fluid in the flywheel housing decreases, and hence the energy stored in the flywheel housing decreases. This energy loss has been given up in the form of fluid kinetic energy, which has been transmitted to the load. The fluid which issues from the flywheel housing leaves with a velocity counter to the direction of rotation relative to the flywheel housing. However, the velocity of this fluid relative to housing 100 is always in the direction of rotation. Mathematical evaluation shows this velocity relative to the housing to approach zero as the fluid level approaches the axis of rotation of the flywheel. At the other limit the fluid jet velocity relative to the housing and in the direction of rotation approaches the peripheral velocity of the flywheel at the jet radius, as the fluid level in the flywheel approaches the jet radius.

This latter factor has the following important consequence: Assume that the flywheel has absorbed its maximum energy from the load, that is, that the fluid level is at its closest point to the axis of rotation. It follows from the preceding description that the fluid velocity in the direction of rotation relative to the housing 100 will be small. This condition occurs simultaneously with the rotational speed of the load output shaft 106, and hence the load energy is small since the system has absorbed the kinetic energy of the load. Thus it is a natural consequence of the system that the fluid speed from the flywheel jets tends in the same direction as the load acceleration turbine 136A. This matching permits the velocity optimizing assembly 150 to accomplish optimization within its range of radial variations.

It is the function of the fluid induction assembly 112 to maintain the rotation of the flywheel assembly at a constant speed. This is achieved by introducing fluid into the flywheel as the torque on shaft 102 increases, or as braking jet fluid impinges turbine 146, as described above. The assembly performs its function by the use of the spring-loaded, pressure operated governor control valve 121 of FIG. 3.

Fluid is available to the governor valve 121 through holes in the central support tube and fluid manifold 110. The valve assembly turns with the fluid induction assembly and forms a rotating seal with the central support tube. A fluid chamber is formed inside the rotating valve assembly, and the rotation generates a fluid pressure which acts on the valve. Axial movement of the valve is resisted by the governor spring 120. The preload on spring 120 is calibrated to hold the valve closed until the desired steady flywheel rotational speed is achieved. At that point, the integrated pressure against the valve is sufficient to overcome the spring pressure so as to open the valve. The valve then passes the working fluid to the interior of the flywheel to increase the flywheel mass moment of inertia, so as to oppose any tendency for the speed of the flywheel to increase.

The fluid passing through the valve 121 is conducted to the interior of the flywheel through the synchronization vanes 118. The valve 121 and vanes 118 function, therefore, efficiently to bring the fluid introduced to the interior of the flywheel up to the angular velocity of the surface of the fluid in the flywheel. It is this matching of fluid speeds which allows the added fluid to be inducted into the flywheel with minimum loss due to turbulence.

Figure 6:
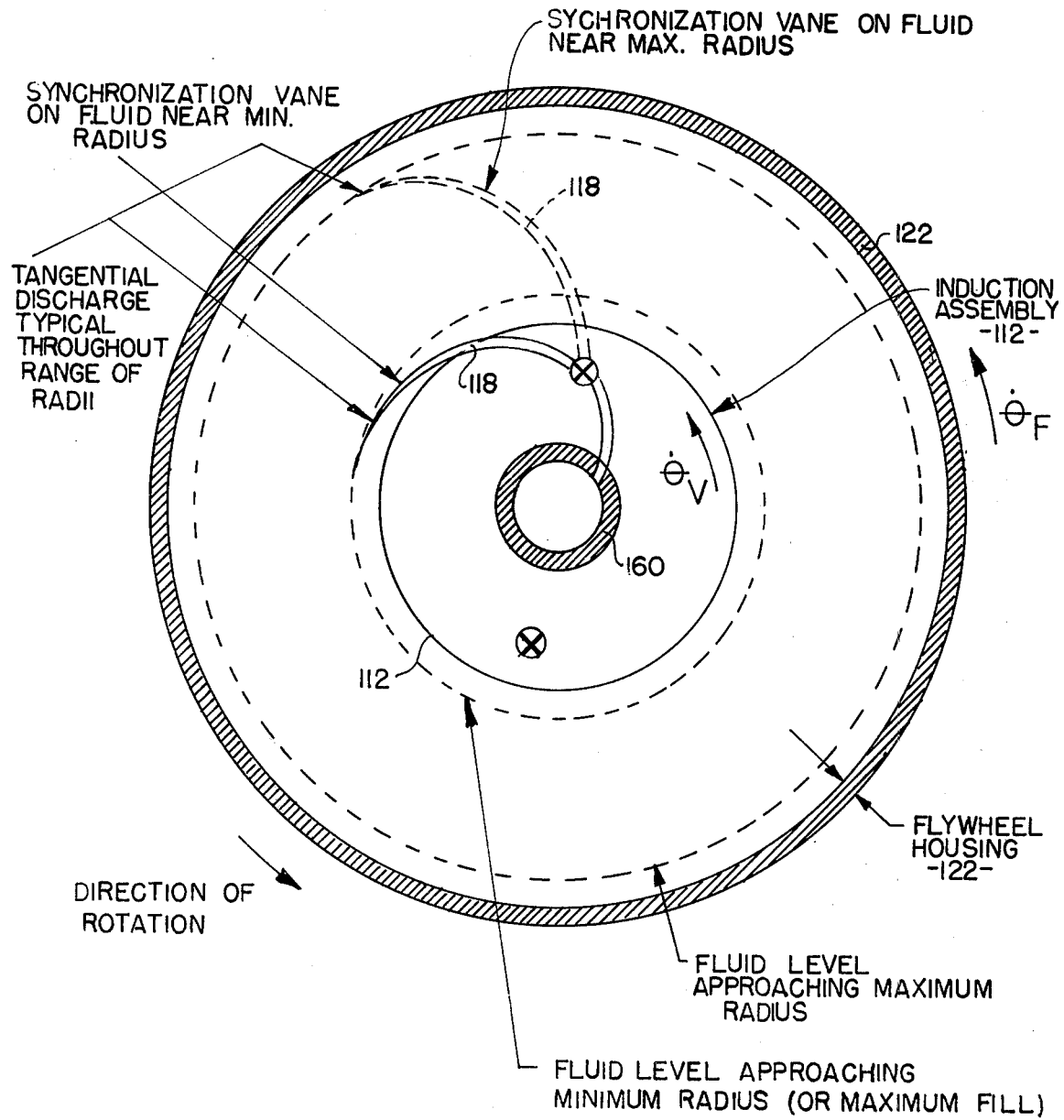
FIG. 6 is a schematic representation of a fluid induction assembly which also is included in the embodiment of FIG. 3, taken along the lines 6—6 of FIG. 3, and shown on a somewhat enlarged scale.

The synchronization vanes 118 are hinged to the central body of the induction assembly 112 (FIG. 6) so that the discharge at the tips of the vanes moves radially through the full range of possible fluid levels within the flywheel. Additionally, and as also shown in FIG. 6, the vanes are curved from their inner hinged ends to their tips in the direction of rotation of the flywheel, so that the discharge over the range of radii is essentially parallel to the fluid surface and in the direction of rotation.

Neglecting losses, mathematical evaluation shows that fluid discharging in the manner described above will have a tangential velocity relative to the stationary housing 100 of $$V_f = 2r\dot{\theta}_v$$

where:
$V_f$ = tangential velocity
$r$ = radius of discharge
$\dot{\theta}_v$ = angular velocity of the vanes.

The gearing 130, 132 and 133 functions to assure that the angular velocity of the vanes is always one-half that of the flywheel, that is:

$$\dot{\theta}_v = \tfrac{1}{2} \dot{\theta}_f$$

where:
$\dot{\theta}_f$ = angular velocity of the flywheel.
Substituting $\dot{\theta}_f$ and $\dot{\theta}_v$ we obtain:

$$v_f = r\dot{\theta}_f$$

Noting that the surface speed of the fluid inside the flywheel at any radius is $$v_{fs} = r\dot{\theta}_{fs}$$

it follows that $v_f = v_{fs}$, and a synchronization of fluid velocity is achieved.

It should be understood that the hinged, synchronization vanes 118 hydroplane on the surface of the fluid within the flywheel housing such that the radius of the vane discharge always equals the radius of the fluid level within the flywheel, that is $r = r_v = r_{fs}$.

The preceding discussion has assumed the varying speed requirements of the load have all been met through the operation of the velocity optimizing assembly 150 with the flywheel angular velocity being held constant. It is possible to extend the load speed range over which the device is effective and efficient by "overriding" the flywheel speed governing assembly and thereby allowing the flywheel to increase or decrease its speed.

The above might be permitted to occur when vanes of the optimizing assembly 150 have travelled to either extreme (i.e. full in or full out). Under either condition the velocity optimizing assembly has reached the limits of its capability to match velocities through radius change.

However, it is possible to adjust the velocity of the fluid jets emitting from the flywheel housing 122 (assuming power being absorbed by the load). This is done by adjusting the flywheel speed and fluid level simultaneously.

For example, assume the velocity optimizing assembly vanes are fully out at the maximum radius. This situation occurs when the fluid speed is high relative to the load acceleration turbine 136A. If the fluid still has excess energy when it arrives at the residual energy detector 152, the detector attempts to increase the radius which it cannot do because that vanes are against a maximum radius stop. Pressure against this stop can be used as a signal to override the flywheel governor.

This override signal can open a valve which puts fluid into the fluid induction assembly 112 via a fluid duct which bypasses the governor valve 121. Adding fluid to the flywheel in this fashion both slows the flywheel below its nominal rotational speed, and increases the fluid level. (The latter is obvious, the former occurs because the mass moment was increased with no energy being added.)

Slowing the flywheel and increasing the fluid level both have the effect of slowing the velocity of the fluid jets from the flywheel housing relative to housing 100. Hence the effect is to reduce the residual energy until the "vane signal" is eliminated, i.e., until the fluid speed and turbine speed are matched.

When the vanes of the optimizing assembly move to the opposite extreme (i.e. fully in at minimum radius) this signal can be used to interrupt flow to the governor control valve 121. A valve in series with the governor valve will accomplish this. This starves the fluid induction process and the flywheel will speed up as the fluid level decreases (i.e., the radius of the level increases).

Both the above phenomena cause the fluid jet velocity relative to housing 100 to increase. This is the desired effect since the velocity optimizing vanes at minimum radius indicate a need for greater fluid velocity.

The central support shaft and manifold tube 110 serves as a stationary shaft about which the braking disc 136, fluid flywheel housing 122, and fluid induction assembly 112 rotate. The central support shaft and manifold tube 110 also serve to receive, distribute and exhaust the working fluid. The support shaft and manifold tube consist of four separate fluid conduits. It supplies braking fluid to the braking disc 136 through a conduit 210, to the flywheel governor control valve 121, to the channel 162 leading to the flywheel spool valves 164 through conduit 160, and through an exhaust conduit 220 to return the fluid to the reservoir.

The fluid reservoir 32 of FIG. 1 is simply a tank of sufficient volume to contain all the working fluid required in the system. A similar reservoir is used in conjunction with the embodiment of FIGS. 3–6. Suitable control valves meter the fluid to the braking disc 136 and to the acceleration control valve 164. In both cases, it is the rate of fluid input that regulates the rate of energy exchange.

The invention provides, therefore, a fluid mechanical flywheel, energy storage brake and power transmission system. The energy is stored in a high speed rotating fluid mass and is transmitted directly by fluid jets in combination with turbines. On the driven load side, the system permits energy to be taken from or added to the load over a wide range of load speeds. This energy transfer takes place optimally over the design speed range. That is to say, the energy is transferred from load to flywheel and vice versa regardless of the relative speeds of the load and the flywheel, with the only energy dissipation being small unavoidable hydrodynamic losses. Therefore, a moving vehicle may be slowed or stopped, and the energy required to slow or stop the vehicle is stored in the system of the invention for subsequent acceleration.

On the power source side, energy may be added to the flywheel fluid mass for storage or passed through it to the load. This latter action also occurs optimally in that the device is constructed so that a constant speed source may be coupled to a load of widely ranging speeds without wasting energy. In this way, the system acts as a continuously variable power transmission means.

Since the system of the invention can store the energy from braking and from a constant speed power source, it is possible to use a more efficient and smaller source, and still have sufficient acceleration capabilities to meet all normal requirements.

The system of the invention may be used in conjunction with vehicles or stationary installations in which the duty cycle requires a constantly varying kinetic energy level in the load and/or where it is desirable to couple the load to a constant speed prime mover or engine.

In order to prevent any losses in the system when it is operating under steady state conditions, a mechanical clutch may be provided which operates to couple the input shaft directly to the output shaft under such conditions.

Although particular embodiments of the invention have been shown and described, modifications may be made. It is intended in the claims to cover the modifications which come within the spirit and scope of the invention.

What is claimed is:

1. An energy storage and transmission system comprising: a flywheel housing defining an inner compartment; means rotatably supporting said flywheel housing for rotation about an axis; means for introducing a working fluid into the interior of the flywheel housing; an output shaft; means including turbine means establishing a fluid coupling between the flywheel housing and the output shaft; and means for removing the working fluid from the interior of the flywheel housing during operation of the system and directing the removed fluid to the turbine means thereby to transmit an acceleration torque to the output shaft.

2. The energy storage and transmission system defined in claim 1, and which includes means for introducing a fluid into said fluid coupling means to establish a braking condition between the output shaft and the flywheel housing.

3. The energy storage and transmission system defined in claim 1, in which said removing means includes fluid-operated valve means, and means for introducing an operating fluid to said removing means to operate said valve means.

4. The energy storage and transmission system defined in claim 1, and which includes means for sensing the velocity of the fluid after it has passed through said turbine means to optimize the coupling between the flywheel housing and the turbine so that such velocity tends towards zero.

5. The energy storage and transmission system defined in claim 5, in which said sensing means comprises a rotatable disc mounted coaxially with said flywheel housing and mechanically coupled to said working fluid introducing means to control the flow of working fluid from said flywheel housing.

6. The energy storage and transmission system defined in claim 4, in which said sensing means comprises a disc and a radially variable vane assembly coupled to said disc for controlling the radius at which the working fluid from the interior of the flywheel housing enters said turbine means.

7. The energy storage and transmission system defined in claim 1, in which said rotatably supporting means comprises a tubular shaft, and in which the working fluid is supplied to said introducing means through said tubular shaft.

8. The energy storage and transmission system defined in claim 7, in which said fluid coupling means includes a first turbine means integral with an end wall of said flywheel housing, and said fluid coupling means further includes a second turbine means rotatably mounted on said tubular shaft and axially spaced from said first turbine means, and in which said working fluid sensing means comprises first means for directing jets of the working fluid from the interior of the flywheel housing at said second turbine means.

9. The energy storage and transmission system defined in claim 8, and which includes means directing braking fluid through said tubular shaft and to the periphery of said second turbine means, and second means located at the periphery of said second turbine means for directing jets of the braking fluid at said first turbine means.

10. The energy storage and transmission system defined in claim 9, and which includes a fluid velocity optimizing assembly interposed between the first and second turbine means.

11. The energy storage and transmission system defined in claim 10, in which said fluid velocity optimizing assembly includes a disc and a radially variable vane assembly coupled to said disc, said disc responding to the jets of working fluid from said first directing means and to the jets of braking fluid from said second directing means to control the variable vane assembly and thereby control the radius at which the working fluid is directed at the second turbine means and the radius at which the braking fluid is directed at the first turbine means.

12. The energy storage and transmission system defined in claim 8, and which includes mechanical means coupling said output shaft to said second turbine.

13. The energy storage and transmission system defined in claim 7, in which said working fluid introducing means comprises a fluid induction assembly rotatably mounted on said tubular shaft, an input shaft, and means mechanically coupling said input shaft to said fluid induction assembly and to said flywheel assembly so that said fluid induction assembly rotates about the axis of said tubular shaft at essentially half the speed of rotation of said flywheel housing.

14. The energy storage and transmission system defined in claim 13, in which said fluid induction assembly includes governor valve means for controlling the passage of working fluid into the interior of said flywheel housing.

15. The energy storage and transmission system defined in claim 14, in which said fluid induction assembly includes hinged vane means extending radially outwardly therefrom in the interior of the flywheel housing for carrying the working fluid into the flywheel housing.

16. The energy storage and transmission system defined in claim 1, and which includes turbine means included in said fluid coupling means and responsive to a braking fluid introduced into the turbine means for causing the turbine means to transmit an acceleration torque to the flywheel housing.

17. The energy storage and transmission system defined in claim 16, and which includes means for sensing the velocity of the fluid after it has passed through said turbine means to optimize the coupling between the flywheel housing and the turbine means so that such velocity tends towards zero.

* * * * *